(12) United States Patent
Chou et al.

(10) Patent No.: US 9,577,916 B1
(45) Date of Patent: Feb. 21, 2017

(54) GATEWAY FLOW PLUGIN CONTAINERS

(71) Applicant: International Business Machines Corporation, Armonk, NY (US)

(72) Inventors: Wei-Ting Chou, Taipei (TW); Chih-Hsiung Liu, Taipei (TW); Hao-Ting Shih, Taipei (TW); Joey H. Y. Tseng, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/957,714

(22) Filed: Dec. 3, 2015

(51) Int. Cl.
*G06F 15/173* (2006.01)
*H04L 12/721* (2013.01)
*G06F 9/445* (2006.01)

(52) U.S. Cl.
CPC ........... *H04L 45/14* (2013.01); *G06F 9/44526* (2013.01)

(58) Field of Classification Search
CPC ........ H04L 67/16; H04L 12/5896; G06F 8/65; G06F 9/50; G06F 9/547; G06F 9/5022; G06F 9/44526
USPC . 709/202, 203, 221, 242; 370/401; 717/120, 168; 726/4
See application file for complete search history.

(56) References Cited

U.S. PATENT DOCUMENTS

| | | | |
|---|---|---|---|
| 7,519,976 B2 | 4/2009 | Blevins | |
| 8,627,328 B2* | 1/2014 | Mousseau | G06F 9/5072 706/47 |
| 2004/0049481 A1* | 3/2004 | Blevins | G06Q 10/06 707/1 |
| 2006/0277537 A1* | 12/2006 | Chan | G06F 8/65 717/168 |
| 2008/0294712 A1* | 11/2008 | Lu | H04L 67/16 709/202 |

(Continued)

FOREIGN PATENT DOCUMENTS

CN 104052796 A 9/2014

OTHER PUBLICATIONS

IBM, "Third-party Gateway Support," IBM WebSphere InfoCenter, p. 1-5, WebSphere Everyplace Server, http://www-01.ibm.com/software/pervasive/products/infocenter/wes/cfggateway.html, Accessed on Jun. 16, 2015.

(Continued)

*Primary Examiner* — Dustin Nguyen
(74) *Attorney, Agent, or Firm* — Robert C. Bunker (57) ABSTRACT

A method for generating and managing at least one user-defined plugin container is provided. The method may include generating the user-defined plugin container. The method may further include registering the generated user-defined plugin container, and at least one routing policy associated with the generated user-defined plugin container, on at least one gateway. Additionally, the method may include activating the registered user-defined plugin container and the registered at least one routing policy. The method may also include deploying the activated user-defined plugin container. The method may further include receiving at least one transaction via the at least one gateway. The method may also include routing the received at least one transaction to the deployed user-defined plugin container. The method may further include processing the received at least one transaction using the user-defined plugin container. The method may also include presenting the processed at least one transaction to at least one device.

20 Claims, 6 Drawing Sheets

(56) References Cited

U.S. PATENT DOCUMENTS

| | | | | |
|---|---|---|---|---|
| 2009/0287772 | A1* | 11/2009 | Stone | G06F 9/547 709/203 |
| 2010/0329269 | A1* | 12/2010 | Selitser | H04L 12/5895 370/401 |
| 2011/0138025 | A1* | 6/2011 | Kobi | G06F 9/50 709/221 |
| 2011/0173108 | A1* | 7/2011 | Rajasekar | H04W 4/18 705/34 |
| 2012/0233668 | A1* | 9/2012 | Leafe | G06F 9/5022 726/4 |
| 2015/0089577 | A1 | 3/2015 | Beckman et al. | |
| 2015/0347119 | A1* | 12/2015 | Wang | G06F 8/65 717/120 |

OTHER PUBLICATIONS

Mell et al., "The NIST Definition of Cloud Computing," National Institute of Standards and Technology, Sep. 2011, p. 1-3, Special Publication 800-145.

* cited by examiner

GATEWAY FLOW PLUGIN CONTAINERS

BACKGROUND

The present invention relates generally to the field of computing, and more specifically, to gateway plugins.

Generally, one of the key functions of a gateway in a cloud system is to serve as a platform for cloud system administrators and application owners to manipulate the transactions that pass in and out of the cloud. For this purpose, gateway products are allowed to run customized functions provided by users. Specifically, users may define customized functions for the gateway using two types of services: plugin service and external service. For example, using the plugin service, gateway products may enable users to define functions for a plugin and upload the plugin to the gateway for execution. Alternatively, users may set up an external service and enable the gateway to forward incoming transactions to the external service for execution.

SUMMARY

A method for generating and managing at least one user-defined plugin container is provided. The method may include generating the at least one user-defined plugin container. The method may further include registering the generated at least one user-defined plugin container, and at least one routing policy associated with the generated at least one user-defined plugin container, on at least one gateway. Additionally, the method may include activating the registered at least one user-defined plugin container and the registered at least one routing policy. The method may also include deploying the activated at least one user-defined plugin container. The method may further include receiving at least one transaction via the at least one gateway. The method may also include routing the received at least one transaction to the deployed at least one user-defined plugin container. The method may further include processing the received at least one transaction using the at least one user-defined plugin container. The method may also include presenting the processed at least one transaction to at least one device.

A computer system for generating and managing at least one user-defined plugin container is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include generating the at least one user-defined plugin container. The method may further include registering the generated at least one user-defined plugin container, and at least one routing policy associated with the generated at least one user-defined plugin container, on at least one gateway. Additionally, the method may include activating the registered at least one user-defined plugin container and the registered at least one routing policy. The method may also include deploying the activated at least one user-defined plugin container. The method may further include receiving at least one transaction via the at least one gateway. The method may also include routing the received at least one transaction to the deployed at least one user-defined plugin container. The method may further include processing the received at least one transaction using the at least one user-defined plugin container. The method may also include presenting the processed at least one transaction to at least one device.

A computer program product for generating and managing at least one user-defined plugin container is provided. The computer program product may include one or more computer-readable storage devices and program instructions stored on at least one of the one or more tangible storage devices, the program instructions executable by a processor. The computer program product may include program instructions to generate the at least one user-defined plugin container. The computer program product may also include program instructions to register the generated at least one user-defined plugin container, and at least one routing policy associated with the generated at least one user-defined plugin container, on at least one gateway. Additionally, the computer program product may further include program instructions to activate the registered at least one user-defined plugin container and the registered at least one routing policy. The computer program product may also include program instructions to deploy the activated at least one user-defined plugin container. The computer program product may further include program instructions to receive at least one transaction via the at least one gateway. The computer program product may also include program instructions to route the received at least one transaction to the deployed at least one user-defined plugin container. The computer program product may further include program instructions to process the received at least one transaction using the at least one user-defined plugin container. The computer program product may also include program instructions to present the processed at least one transaction to at least one device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly, to gateway plugins. The following described exemplary embodiments provide a system, method and program product for generating and managing user-defined plugin containers associated with gateways. Therefore, the present embodiment has the capacity to improve the technical field associated with gateway plugins by enabling users to define customized functions for plugins, and deploy the plugins, by using containers. Specifically, the present embodiment may enable users to define customized plugins using containers and deploying the containers locally and/or externally for use by gateways.

As previously described, users may define customized functions for gateways using two types of services: plugin service and external service. For example, using the plugin service, users are enabled to define functions for a plugin and upload the plugin to the gateway for execution. However, the user-defined functions for the plugins are limited since the plugin is executing within the gateway runtime, so the user-defining options, such as the programming languages and the libraries, are restricted by what the gateway runtime provides. Alternatively, users can set up an external service to enable the gateway to forward incoming transactions to the external service for execution. However, although users are able to define functions using the programming languages and tools they want, users have to hardcode the service address in the gateway which may present problems when moving the external services somewhere else. As such, it may be advantageous, among other things, to provide a system, method, and program product for generating and managing user-defined plugin containers. Specifically, a system, method, and program product may enable users to define customized plugins on containers, which enable users to define customized plugins with no restrictions from gateway runtime, as well as enable gateways to manage the plugin containers using the gateway runtime, and dynamically deploy the container locally or externally.

According to at least one implementation of the present embodiment, user-defined plugin containers may be generated. Then, the generated user-defined plugin containers may be registered and activated. Thereafter, the registered and activated user-defined plugin containers may be deployed. Additionally, transactions may be received via the gateways. Next, the received transactions may be routed to the deployed user-defined plugin containers. Then, the received transactions may be processed according to protocols associated with the user-defined plugin containers. Next, the processed transactions may be presented to back-end devices.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for generating and managing user-defined plugin containers associated with gateways.

According to at least one implementation, user-defined plugin containers may be generated. Then, the generated user-defined plugin containers may be registered and activated. Thereafter, the registered and activated user-defined plugin containers may be deployed. Additionally, transactions may be received via the gateways. Next, the received transactions may be routed to the deployed user-defined plugin containers. Then, the received transactions may be processed according to protocols associated with the user-defined plugin containers. Next, the processed transactions may be presented to backend devices.

Figure 1:
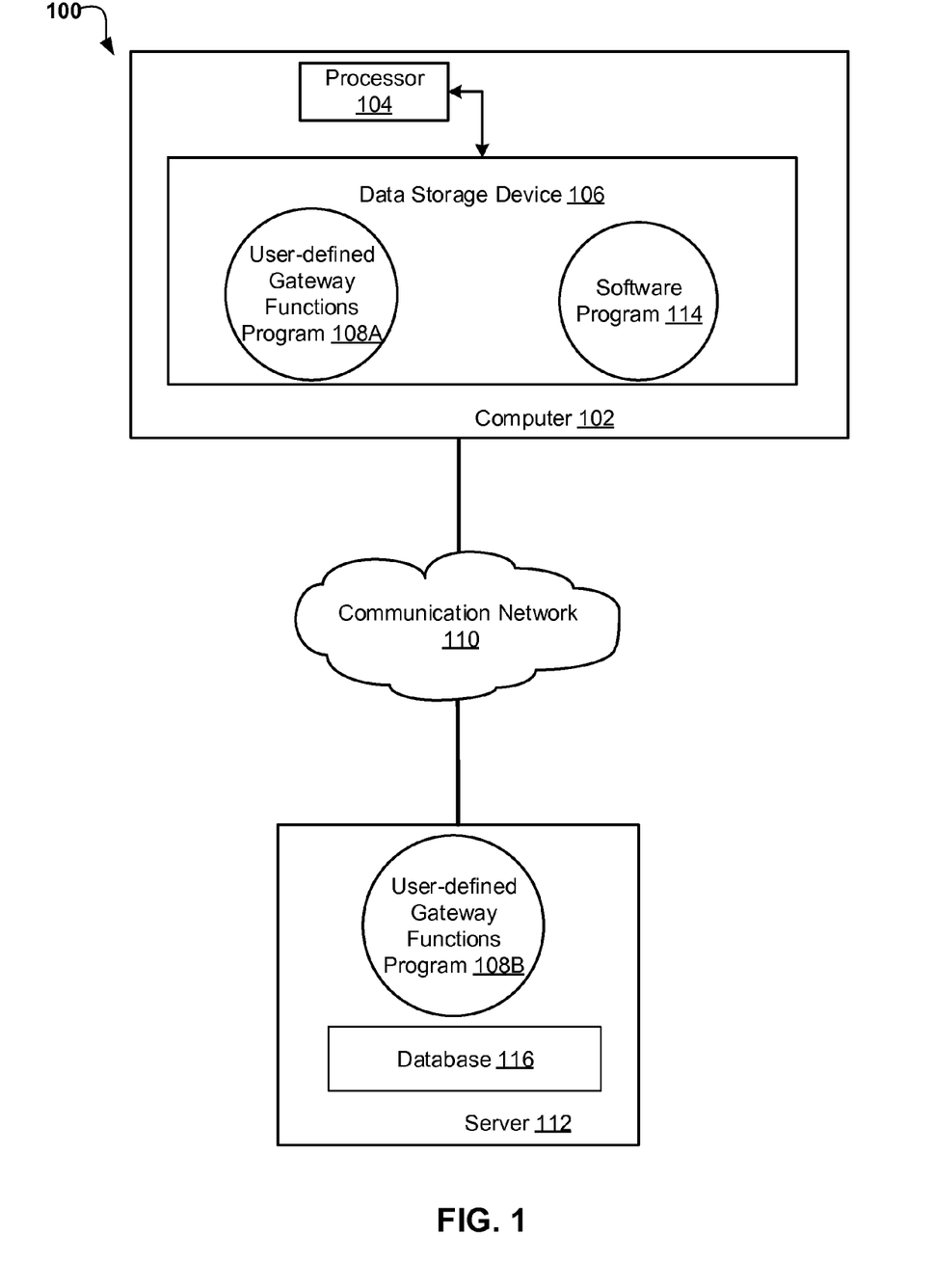
FIG. 1 illustrates a networked computer environment according to one embodiment.

Referring now to FIG. 1, an exemplary networked computer environment 100 in accordance with one embodiment is depicted. The networked computer environment 100 may include a computer 102 with a processor 104 and a data storage device 106 that is enabled to run a user-defined gateway functions program 108A and a software program 114. The software program 114 may be an application program such as an internet browser and an email program. The user-defined gateway functions program 108A may communicate with the software program 114. The networked computer environment 100 may also include a server 112 that is enabled to run a user-defined gateway functions program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 4, server computer 112 may include internal components 800a and external components 900a, respectively, and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the user-defined gateway functions program 108A, 108B may interact with a database 116 that may be embedded in various storage devices, such as, but not limited to a mobile device 102, a networked server 112, or a cloud storage service.

According to the present embodiment, a program, such as a user-defined gateway functions program 108A and 108B may run on the client computer 102 or on the server computer 112 via a communications network 110. The user-defined gateway functions program 108A, 108B may generate and manage user-defined plugin containers. Specifically, a user using a computer, such as computer 102, may run a user-defined gateway functions program 108A, 108B, that interacts with a software program 114, such as Firefox® (Firefox and all Firefox-based trademarks and logos are trademarks or registered trademarks of Firefox and/or its affiliates) to receive transactions associated with the software program 114 via a gateway, route the transactions to the user-defined plugin containers, and process the received transactions according to protocols associated with the user-defined plugin containers.

Figure 2:
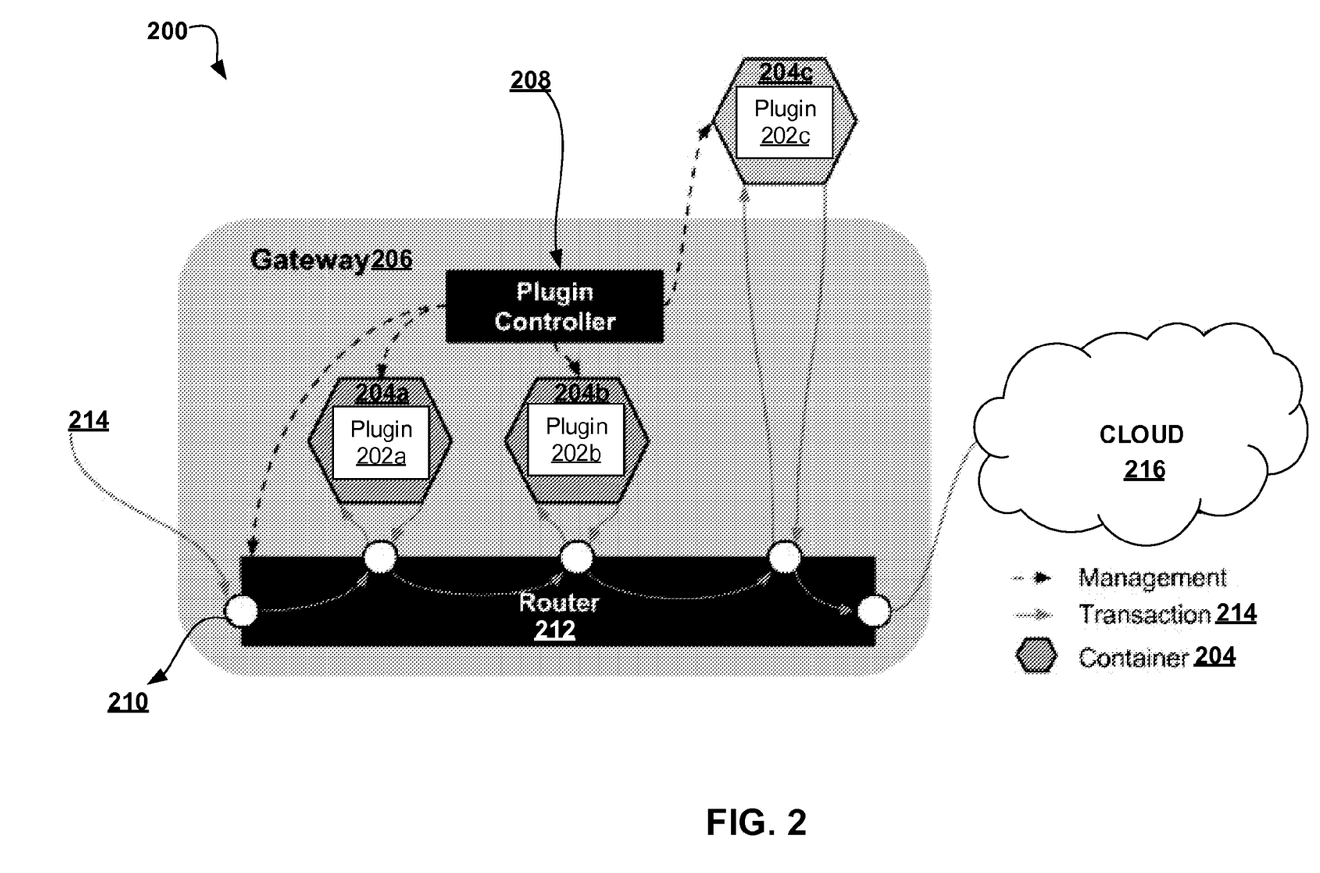
FIG. 2 is block diagram illustrative of a user-defined plugin container program in accordance with one embodiment.

Referring now to FIG. 2, a block diagram 200 illustrative of a user-defined gateway functions program 108A, 108B (FIG. 1) according to one embodiment is depicted. As previously described in FIG. 1, the user-defined gateway functions program 108A, 108B (FIG. 1) may generate and manage user-defined plugin containers. Specifically, the user-defined gateway functions program 108A, 108B (FIG. 1) may enable users to define and develop customized plugins, such as plugin 202a, plugin 202b, and plugin 202c, on containers 204, and manage the user-defined customized plugins 202a, 202b, 202c using a plugin controller 208. Furthermore, using the plugin controller 208, the user-defined gateway functions program 108A, 108B (FIG. 1) may register the user-defined plugin containers 204a, 204b, and 204c with a gateway 206. Specifically, the user-defined gateway functions program 108A, 108B (FIG. 1) may register the user-defined plugin containers 204a, 204b, and 204c on the gateway 206, and may also register user-defined routing policies associated with the user-defined plugin containers 204a, 204b, and 204c on the gateway 206 to enable the gateway 206 to recognize the user-defined plugin containers 204a, 204b, and 204c and to route incoming transactions 214 to the user-defined plugin containers 204a, 204b, and 204c. Also, using the plugin controller 208, the user-defined gateway functions program 108A, 108B (FIG. 1) may register external computing resources, such as virtual machines (not shown), to the gateway 206 to enable the gateway to externally run the user-defined plugin containers 204a, 204b, and 204c on the external computing resources. Furthermore, using the plugin controller 208, the user-defined gateway functions program 108A, 108B (FIG. 1) may activate the user-defined routing policies by implementing the user-defined routing policies for the user-defined plugin containers 204a, 204b, and 204c to route incoming transactions 214 to the user-defined plugin containers 204a, 204b, and 204c.

Then, using the plugin controller 208, the user-defined gateway functions program 108A, 108B (FIG. 1) may deploy the user-defined plugin containers 204a, 204b, and 204c locally on the gateway 206 and/or externally on the registered external computing resources. For example, the user-defined gateway functions program 108A, 108B (FIG. 1) may deploy the user-defined plugin containers 204a and 204b on the gateway 206, and also deploy the user-defined plugin container 204c on an external computing resource. Next, the user-defined gateway functions program 108A, 108B (FIG. 1) may receive transactions 214 via routing nodes 210 that are associated with a router 212 on the gateway 206. Thereafter, based on the user-defined routing policies, the user-defined gateway functions program 108A, 108B (FIG. 1) may route the received transactions 214 to the user-defined plugin containers 204a, 204b, and 204c. Then, using the user-defined plugin containers 204a, 204b, and 204c, the user-defined gateway functions program 108A, 108B (FIG. 1) may process the received transactions 214. Next, the user-defined gateway functions program 108A, 108B (FIG. 1) may present the processed received transactions to backend devices via a network, such as a cloud 216.

Figure 3:
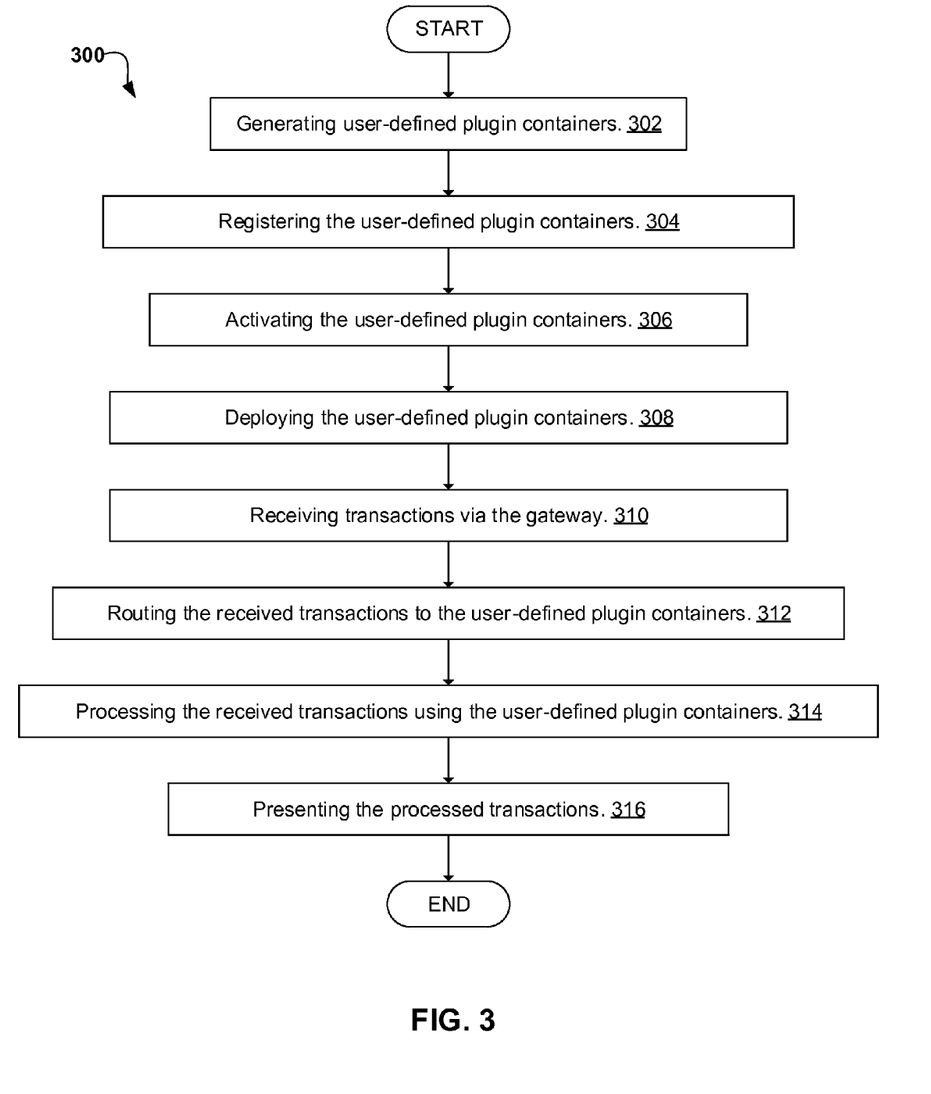
FIG. 3 is an operational flowchart illustrating the steps carried out by a program for generating and managing at least one user-defined plugin container according to one embodiment.

Referring now to FIG. 3, an operational flowchart 300 illustrating the steps carried out by a program for generating and managing user-defined plugin containers 204a, 204b, and 204c (FIG. 2) associated with gateways 206 (FIG. 2) in accordance with one embodiment is depicted. At 302, the user-defined gateway functions program 108A, 108B (FIG. 1) may generate user-defined plugin containers 204a, 204b, and 204c (FIG. 2). As previously described in FIG. 2, the user-defined gateway functions program 108A, 108B (FIG. 1) may enable users to define and develop customized plugins, such as plugin 202a (FIG. 2), plugin 202b (FIG. 2), and plugin 202c (FIG. 2) on containers 204 (FIG. 2). For example, using a software development kit (SDK), the user-defined gateway functions program 108A, 108B (FIG. 1) may enable users to define and develop customized plugins 202a, 202b, and 202c (FIG. 2), such as a rate-limiting plugin, on a container 204 (FIG. 2) with no gateway runtime restrictions.

Then, at 304, the user-defined gateway functions program 108A, 108B (FIG. 1) may register the user-defined plugin containers 204a, 204b, and 204c (FIG. 2) on the gateway 206 (FIG. 2). Specifically, and as previously described in FIG. 2, the user-defined gateway functions program 108A, 108B (FIG. 1) may register the user-defined plugin containers 204a, 204b, and 204c (FIG. 2) on the gateway 206 (FIG. 2), and may also register user-defined routing policies associated with the user-defined plugin containers 204a, 204b, and 204c (FIG. 2) on the gateway 206 (FIG. 2) to enable the gateway 206 (FIG. 2) to communicate with the user-defined plugin containers 204a, 204b, and 204c (FIG. 2) and to connect the user-defined plugin containers 204a, 204b, and 204c (FIG. 2). Also, using the plugin controller 208 (FIG. 2), the user-defined gateway functions program 108A, 108B (FIG. 1) may register external computing resources, such as virtual machines (not shown), to the gateway 206 (FIG. 2) to enable the gateway 206 (FIG. 2) to externally run the user-defined plugin containers 204a, 204b, and 204c (FIG. 2) on the external computing resources. For example, the user-defined gateway functions program 108A, 108B (FIG. 1) may register a user-defined plugin container 204c (FIG. 2), such as a rate limiting plugin container, and register the user-defined routing policies associated with the user-defined plugin container 204c (FIG. 2) on the gateway 206 (FIG. 2). Furthermore, if the user-defined gateway functions program 108A, 108B (FIG. 1) runs the user-defined plugin container 204c (FIG. 2) on an external computing resource, the user-defined gateway functions program 108A, 108B (FIG. 1) may register the external computing resource.

Next, at 306, the user-defined gateway functions program 108A, 108B (FIG. 1) may activate the user-defined plugin containers 204a, 204b, and 204c (FIG. 2). Specifically, and as previously described in FIG. 2, the user-defined gateway functions program 108A, 108B (FIG. 1) may activate the user-defined plugin containers 204a, 204b, and 204c (FIG. 2) by implementing the user-defined plugin containers 204a, 204b, and 204c (FIG. 2) and the routing policies to enable the gateway 206 (FIG. 2) to route transactions 214 (FIG. 2) to the user-defined plugin containers 204a, 204b, and 204c (FIG. 2). For example, the user-defined gateway functions program 108A, 108B (FIG. 1) may activate the user-defined plugin containers 204a 204b (FIG. 2), and implement routing policies associated with the user-defined plugin containers 204a and 204b (FIG. 2) to route transactions 214 (FIG. 2) to the user-defined plugin containers 204a and 204b (FIG. 2).

Next, at 308, the user-defined gateway functions program 108A, 108B (FIG. 1) may deploy the registered user-defined plugin containers 204a, 204b, and 204c (FIG. 2). As previously described in steps 304 and 306, the user-defined gateway functions program 108A, 108B (FIG. 1) may register and activate the user-defined plugin containers 204a, 204b, and 204c (FIG. 2), the routing policies associated with the user-defined plugin containers 204a, 204b, and 204c (FIG. 2), and the external computing resources that may be associated with the user-defined plugin containers 204a, 204b, and 204c (FIG. 2). Thereafter, based on the registration, the user-defined gateway functions program 108A, 108B (FIG. 1) may deploy the user-defined plugin containers 204a, 204b, and 204c (FIG. 2) on the gateway 206 (FIG. 2) and/or on the registered external computing resources. For example, the user-defined gateway functions program 108A, 108B (FIG. 1) may register and activate the user-defined plugin containers 204a, 204b, and 204c (FIG. 2) as well as the routing policies associated with the user-defined plugin containers 204a, 204b, and 204c (FIG. 2) on the gateway 206 (FIG. 2). Furthermore, the user-defined gateway functions program 108A, 108B (FIG. 1) may register an external computing resource associated with the user-defined plugin containers 204c (FIG. 2). As such, the user-defined gateway functions program 108A, 108B (FIG. 1) may deploy the user-defined plugin containers 204a (FIG. 2) and 204b (FIG. 2) on the gateway 206 (FIG. 2), and may deploy the user-defined plugin container 204c (FIG. 2) on the external computing resource.

Then, at 310, the user-defined gateway functions program 108A, 108B (FIG. 1) may receive transactions 214 (FIG. 2) via the gateway 206 (FIG. 2). Specifically, and as previously described in FIG. 2, the user-defined gateway functions program 108A, 108B (FIG. 1) may receive transactions 214 (FIG. 2) via routing nodes 210 (FIG. 2) that are associated with a router 212 (FIG. 2) on the gateway 206 (FIG. 2). For example, the user-defined gateway functions program 108A, 108B (FIG. 1) may receive transactions 214 (FIG. 2), such as http requests, via routing nodes 210 (FIG. 2) on a router 212 (FIG. 2) that is associated with a gateway 206 (FIG. 2), such as an http proxy gateway, to control the amount of http requests received by the gateway 206 (FIG. 2).

Next, at 312, the user-defined gateway functions program 108A, 108B (FIG. 1) may route the received transactions 214 (FIG. 2) to the registered user-defined plugin containers 204a, 204b, and 204c (FIG. 2). Specifically, and as previously described in FIG. 2, based on the registered user-defined routing policies, the user-defined gateway functions program 108A, 108B (FIG. 1) may route the received transactions 214 (FIG. 2) to the registered user-defined plugin containers 204a, 204b, and 204c (FIG. 2). For example, and as previously described at step 310, the user-defined gateway functions program 108A, 108B (FIG. 1) may receive transactions 214 (FIG. 2), such as http requests, via routing nodes 210 (FIG. 2) on a router 212 (FIG. 2) that is associated with a gateway 206 (FIG. 2), such as an http proxy gateway. Thereafter, the user-defined gateway functions program 108A, 108B (FIG. 1) may route the http requests 214 (FIG. 2) to one or more of the registered user-defined plugin containers 204a, 204b, and 204c (FIG. 2), that may include a rate-limiting plugin to control the amount of http requests received by the http proxy gateway 206 (FIG. 2).

Then, at 314, the user-defined gateway functions program 108A, 108B (FIG. 1) may process the received transactions 214 (FIG. 2) using the registered user-defined plugin containers 204a, 204b, and 204c (FIG. 2). As previously described at step 302, the user-defined gateway functions program 108A, 108B (FIG. 1) may enable users to define customizations for user-defined plugin containers 204a, 204b, and 204c (FIG. 2). Furthermore, as previously described at step 312, based on the registered user-defined routing policies, the user-defined gateway functions program 108A, 108B (FIG. 1) may route received transactions 214 (FIG. 2), such as http requests, to the registered user-defined plugin containers 204a, 204b, and 204c (FIG. 2). As such, the user-defined gateway functions program 108A, 108B (FIG. 1) may process the received transactions 214 (FIG. 2) according to the user-defined customizations that are associated with the registered user-defined plugin containers 204a, 204b, and 204c (FIG. 2). For example, the user-defined gateway functions program 108A, 108B (FIG. 1) may route http requests 214 (FIG. 2) to one or more of the registered user-defined plugin containers 204a, 204b, and 204c (FIG. 2), that may include a rate-limiting plugin to control the amount of http requests received by the http proxy gateway 206 (FIG. 2). Therefore, using the rate-limiting plugin container, the user-defined gateway functions program 108A, 108B (FIG. 1) may process the received http requests 214 (FIG. 2) and determine whether the number of http requests 214 (FIG. 2) has exceeded the user-defined threshold before presenting the http requests 214 (FIG. 2) to backend devices, such as a server 112 (FIG. 1).

Next, at 316, the user-defined gateway functions program 108A, 108B (FIG. 1) may present the processed received transactions to backend devices. As previously described at step 314, the user-defined gateway functions program 108A, 108B (FIG. 1) may process the received transactions 214 (FIG. 2) according to the user-defined customizations that are associated with the registered user-defined plugin containers 204a, 204b, and 204c (FIG. 2). Thereafter, the user-defined gateway functions program 108A, 108B (FIG. 1) may present the processed received transactions 214 (FIG. 2) to backend devices via networks, such as a cloud 216 (FIG. 2). For example, using a rate-limiting plugin container, the user-defined gateway functions program 108A, 108B (FIG. 1) may process received http requests 214 (FIG. 2) and determine that the number of http requests 214 (FIG. 2) has not exceeded the user-defined threshold associated with the rate-limiting plugin container. As such, the user-defined gateway functions program 108A, 108B (FIG. 1) may present the http requests 214 (FIG. 2) to backend devices, such as servers 112 (FIG. 1), via networks, such as a cloud 216 (FIG. 2).

It may be appreciated that FIGS. 2 and 3 provide only illustrations of one implementation and do not imply any limitations with regard to how different embodiments may be implemented. Many modifications to the depicted environments may be made based on design and implementation requirements.

Figure 4:
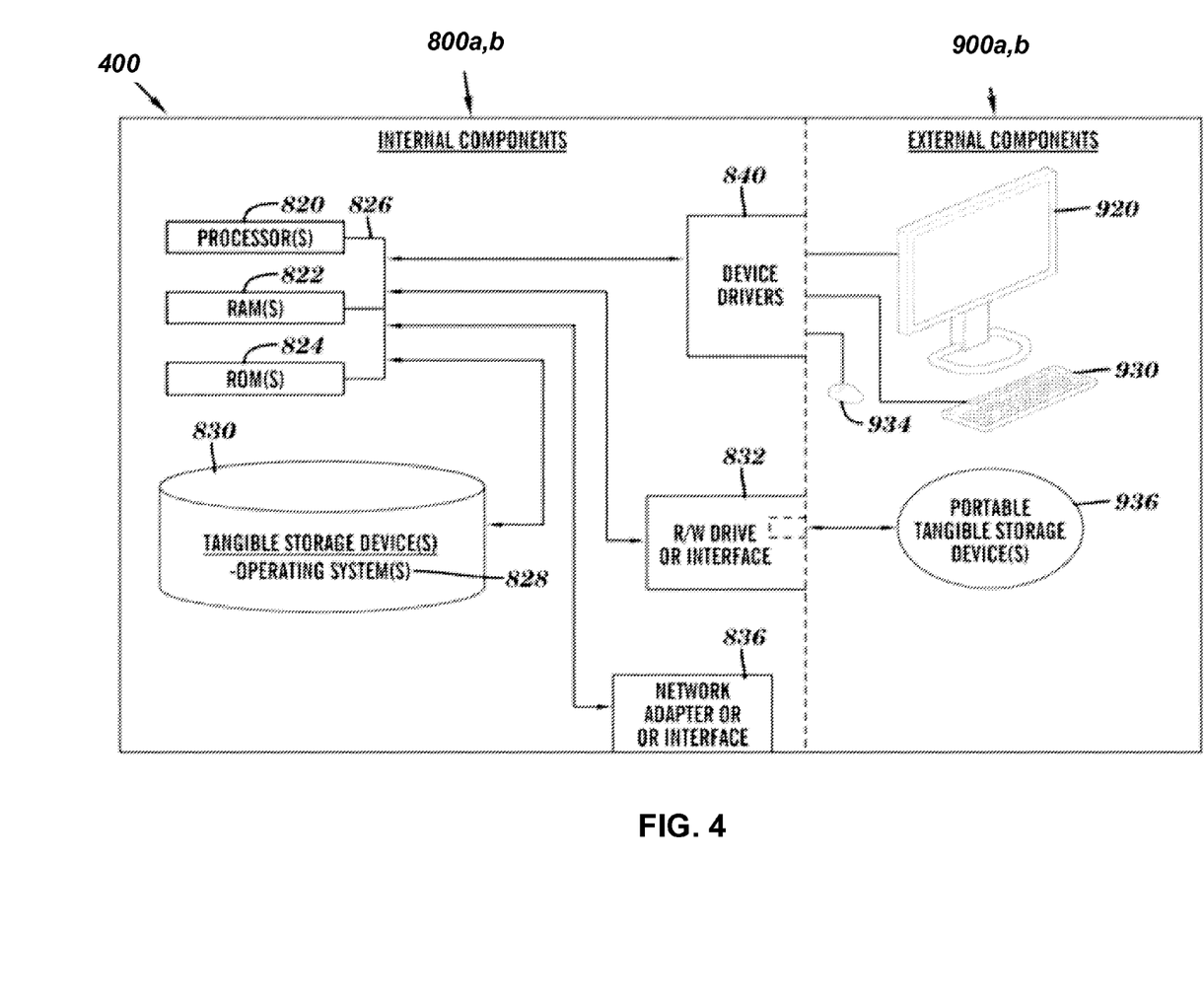
FIG. 4 is a block diagram of the system architecture of a program for generating and managing at least one user-defined plugin container according to one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800 a, b and external components 900 a, b illustrated in FIG. 4. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, the software program 114 (FIG. 1) and the user-defined gateway functions program 108A (FIG. 1) in client computer 102 (FIG. 1), and the user-defined gateway functions program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as a user-defined gateway functions program 108A and 108B (FIG. 1), can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. The user-defined gateway functions program 108A (FIG. 1) and software program 114 (FIG. 1) in client computer 102 (FIG. 1), and the user-defined gateway functions program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the user-defined gateway functions program 108A (FIG. 1) and software program 114 (FIG. 1) in client computer 102 (FIG. 1) and the user-defined gateway functions program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
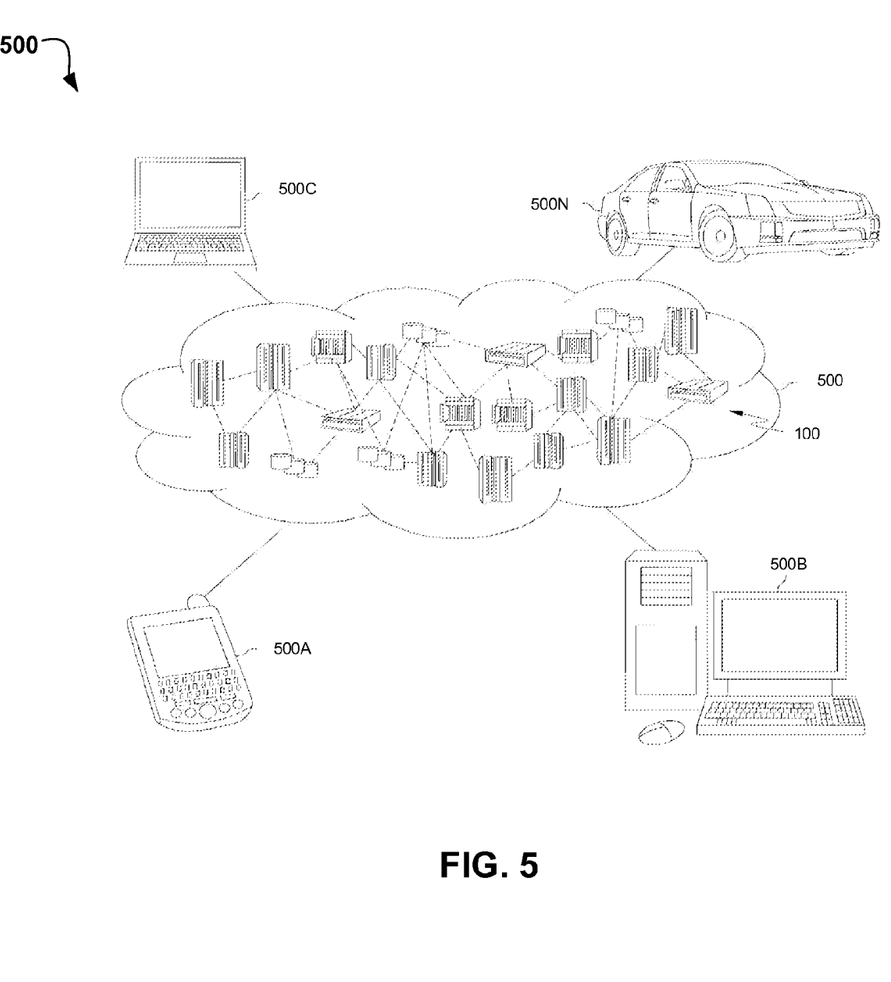
FIG. 5 is a block diagram of an illustrative cloud computing environment including the computer system depicted in FIG. 1, in accordance with an embodiment of the present disclosure.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
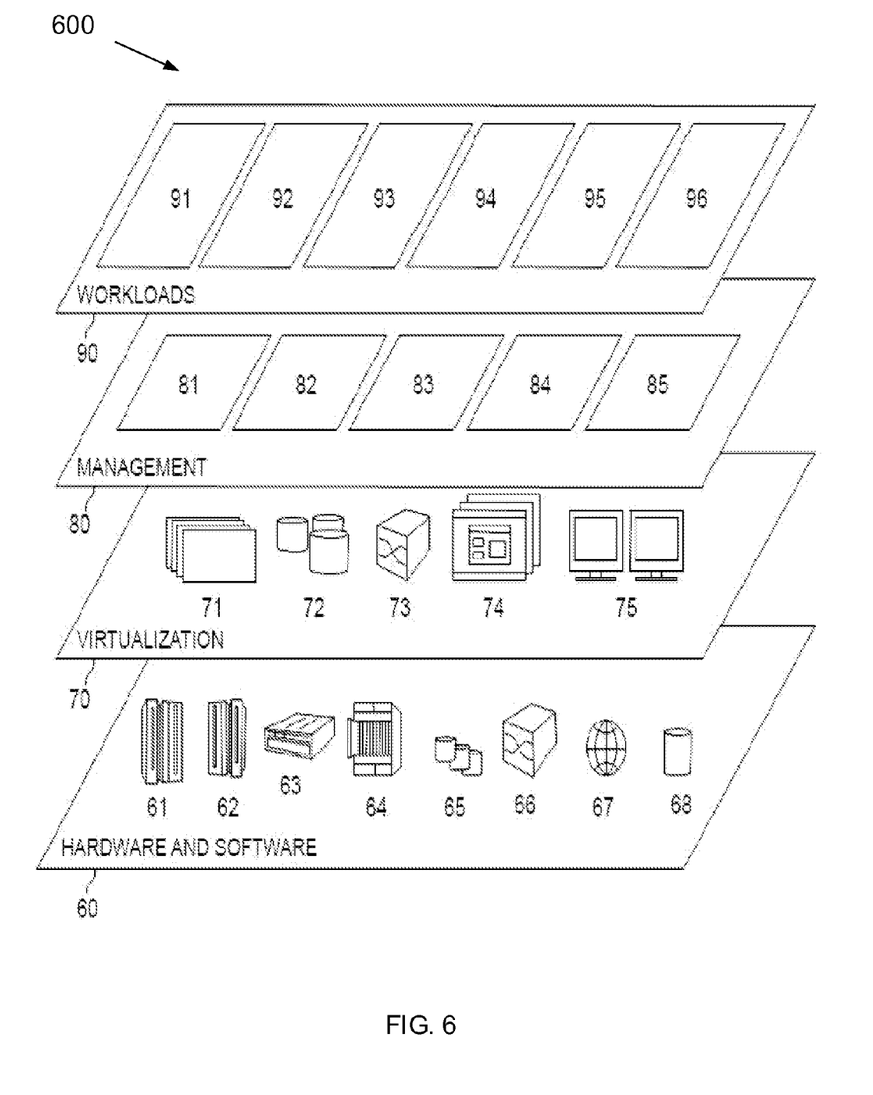
FIG. 6 is a block diagram of functional layers of the illustrative cloud computing environment of FIG. 5, in accordance with an embodiment of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and User-defined Gateway Functions 96. A User-Defined Gateway Functions Program 108A, 108B (FIG. 1) may be offered "as a service in the cloud" (i.e., Software as a Service (SaaS)) for applications running on mobile devices 102 (FIG. 1) and may generate and manage user-defined plugin containers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating and managing a plurality of user-defined plugin containers, the method comprising:
   generating the plurality of user-defined plugin containers for connectivity to at least one gateway, wherein each of the plurality of user-defined plugin containers contain at least one customized plugin associated with a plurality of customized plugins unrestricted by the at least one gateway;

registering the generated plurality of user-defined plugin containers, and at least one routing policy associated with the generated user-defined plugin containers, on the at least one gateway;
activating the registered plurality of user-defined plugin containers and the registered at least one routing policy;
deploying the activated plurality of user-defined plugin containers;
receiving at least one transaction via the at least one gateway;
routing the received at least one transaction to the deployed plurality of user-defined plugin containers;
processing the received at least one transaction using the plurality of user-defined plugin containers; and
presenting the processed at least one transaction to at least one device.

2. The method of claim 1, wherein generating the plurality of user-defined plugin containers further comprises:
enabling at least one user to define a plurality of customizations, wherein the plurality of customizations are unrestricted by the at least one gateway, for the plurality of customized plugins that are contained in the plurality of user-defined plugin containers.

3. The method of claim 1, further comprising:
registering at least one external computing resource, where the at least one external computing resource is enabled to run the plurality of user-defined plugin containers.

4. The method of claim 3, wherein the registered plurality of user-defined plugin containers are deployed on at least one of the at least one gateway and the registered at least one external computing resource.

5. The method of claim 1, wherein the received at least one transaction comprises a plurality of http requests, and the at least one gateway comprises an http proxy server.

6. The method of claim 2, wherein processing the received at least one transaction further comprises:
processing the received at least one transaction based on the defined plurality of customizations.

7. The method of claim 1, further comprising:
using a plugin controller to register the generated plurality of user-defined plugin containers and to deploy the registered plurality of user-defined plugin containers.

8. A computer system for generating and managing a plurality of user-defined plugin containers, comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
generating the plurality of user-defined plugin containers for connectivity to at least one gateway, wherein each of the plurality of user-defined plugin containers contain at least one customized plugin associated with a plurality of customized plugins unrestricted by the at least one gateway;
registering the generated plurality of user-defined plugin containers, and at least one routing policy associated with the generated user-defined plugin containers, on the at least one gateway;
activating the registered plurality of user-defined plugin containers and the registered at least one routing policy;
deploying the activated plurality of user-defined plugin containers;
receiving at least one transaction via the at least one gateway;
routing the received at least one transaction to the deployed plurality of user-defined plugin containers;
processing the received at least one transaction using the plurality of user-defined plugin containers; and
presenting the processed at least one transaction to at least one device.

9. The computer system of claim 8, wherein generating the plurality of user-defined plugin containers further comprises:
enabling at least one user to define a plurality of customizations, wherein the plurality of customizations are unrestricted by the at least one gateway, for the plurality of customized plugins that are contained in the plurality of user-defined plugin containers.

10. The computer system of claim 8, further comprising:
registering at least one external computing resource, where the at least one external computing resource is enabled to run the plurality of user-defined plugin containers.

11. The computer system of claim 10, wherein the registered plurality of user-defined plugin containers are deployed on at least one of the at least one gateway and the registered at least one external computing resource.

12. The computer system of claim 8, wherein the received at least one transaction comprises a plurality of http requests, and the at least one gateway comprises an http proxy server.

13. The computer system of claim 9, wherein processing the received at least one transaction further comprises:
processing the received at least one transaction based on the defined plurality of customizations.

14. The computer system of claim 8, further comprising:
using a plugin controller to register the generated plurality of user-defined plugin containers and to deploy the registered plurality of user-defined plugin containers.

15. A computer program product for generating and managing a plurality of user-defined plugin containers, comprising:
one or more computer-readable storage devices and program instructions stored on at least one of the one or more tangible storage devices, the program instructions executable by a processor, the program instructions comprising:
program instructions to generate the plurality of user-defined plugin containers for connectivity to at least one gateway, wherein each of the plurality of user-defined plugin containers contain at least one customized plugin associated with a plurality of customized plugins unrestricted by the at least one gateway;
program instructions to register the generated plurality of user-defined plugin containers, and at least one routing policy associated with the generated user-defined plugin containers, on the at least one gateway;
program instructions to activate the registered plurality of user-defined plugin containers and the registered at least one routing policy;
program instructions to deploy the activated plurality of user-defined plugin containers;
program instructions to receive at least one transaction via the at least one gateway;
program instructions to route the received at least one transaction to the deployed plurality of user-defined plugin containers;
program instructions to process the received at least one transaction using the plurality of user-defined plugin containers; and program instructions to present the processed at least one transaction to at least one device.

16. The computer program product of claim 15, wherein the program instructions to generate the plurality of user-defined plugin containers further comprises:

program instructions to enable at least one user to define a plurality of customizations, wherein the plurality of customizations are unrestricted by the at least one gateway, for the plurality of customized plugins that are contained in the plurality of user-defined plugin containers.

17. The computer program product of claim 15, further comprising:

program instructions to register at least one external computing resource, where the at least one external computing resource is enabled to run the plurality of user-defined plugin containers.

18. The computer program product of claim 15, wherein the registered plurality of user-defined plugin containers are deployed on at least one of the at least one gateway and the registered at least one external computing resource.

19. The computer program product of claim 18, wherein the program instructions to process the received at least one transaction further comprises:

program instructions to process the received at least one transaction based on the defined plurality of customizations.

20. The computer program product of claim 19, further comprising:

program instructions to using a plugin controller to register the generated plurality of user-defined plugin containers and to deploy the registered plurality of user-defined plugin containers.

\* \* \* \* \*